United States Patent
Watanabe

(10) Patent No.: US 9,620,313 B2
(45) Date of Patent: Apr. 11, 2017

(54) ENGINE STARTING DEVICE

(71) Applicant: Alpha Corporation, Yokohama-shi, Kanagawa (JP)

(72) Inventor: Yusuke Watanabe, Yokohama (JP)

(73) Assignee: ALPHA CORPORATION, Kanagawa (JP)

( * ) Notice: Subject to any disclaimer, the term of this patent is extended or adjusted under 35 U.S.C. 154(b) by 38 days.

(21) Appl. No.: 14/435,266

(22) PCT Filed: Nov. 29, 2013

(86) PCT No.: PCT/JP2013/082174
§ 371 (c)(1),
(2) Date: Apr. 13, 2015

(87) PCT Pub. No.: WO2014/091945
PCT Pub. Date: Jun. 19, 2014

(65) Prior Publication Data
US 2015/0294817 A1    Oct. 15, 2015

(30) Foreign Application Priority Data
Dec. 11, 2012  (JP) .................................. 2012-270052

(51) Int. Cl.
H01H 9/00        (2006.01)
H01H 27/06      (2006.01)
(Continued)

(52) U.S. Cl.
CPC ....... H01H 27/06 (2013.01); B60R 25/02115 (2013.01); F02N 11/087 (2013.01);
(Continued)

(58) Field of Classification Search
CPC .... H01H 27/06; H01H 9/02; H01H 2223/012; B60R 25/02115; F02N 11/087; F02N 2011/0874
(Continued)

(56) References Cited

U.S. PATENT DOCUMENTS 5,756,947 A  *  5/1998  Trimble, Jr. ........... H01H 27/06
                                                                 200/11 C
2008/0178699 A1    7/2008  Kubota
(Continued)

FOREIGN PATENT DOCUMENTS

CN          101527218 A      9/2009
DE    20 2009 000 156 U1     4/2009
(Continued)

OTHER PUBLICATIONS

Official Communication issued in International Patent Application No. PCT/JP2013/082174, mailed on Feb. 10, 2014.
(Continued)

*Primary Examiner* — Felix O Figueroa
*Assistant Examiner* — Lheiren Mae A Caroc
(74) *Attorney, Agent, or Firm* — Keating and Bennett, LLP

(57) ABSTRACT

An object of the present invention is to provide an engine starting device which can prevent rattling of an ignition switch in a coupled state. Provided is an engine starting device including: a housing 2 accommodating a rotational operation shaft 1; and an ignition switch 3 coupled to the housing 2 and configured to be actuated upon application of rotational operation force to the rotational operation shaft 1. The ignition switch 3 is fitted and held in an attachment recess 4 formed in the housing 2, in such a way as to be prevented from falling from the attachment recess 4 by appropriate snap-locking portion 5. The peripheral wall
(Continued)

surfaces of the ignition switch 3 and the attachment recess 4 on the fitting start end side and the peripheral wall surfaces thereof on the fitting finish end side come into pressure contact with each other substantially simultaneously with each other when the depth of the fitting of the ignition switch 3 to the attachment recess 4 reaches a predetermined depth, to thereby reduce rattling in the radial direction.

3 Claims, 3 Drawing Sheets

(51) Int. Cl.
*H01H 9/02* (2006.01)
*F02N 11/08* (2006.01)
*F02N 15/00* (2006.01)
*B60R 25/021* (2013.01)

(52) U.S. Cl.
CPC .............. *F02N 15/006* (2013.01); *H01H 9/02* (2013.01); *F02N 2011/0874* (2013.01); *H01H 2223/012* (2013.01)

(58) Field of Classification Search
USPC ....................................................... 200/61.54
See application file for complete search history.

(56) References Cited

U.S. PATENT DOCUMENTS

2009/0194396 A1  8/2009  Wu et al.
2009/0223785 A1  9/2009  Urakawa et al.

FOREIGN PATENT DOCUMENTS

| EP | 1 091 374 A1 | 4/2001 |
| JP | 52-39196 A | 3/1977 |
| JP | 10-223100 A | 8/1998 |
| JP | 2000-127668 A | 5/2000 |
| JP | 2004-234986 A | 8/2004 |
| JP | 4180394 B2 | 11/2008 |
| JP | 2012-146508 A | 8/2012 |
| WO | 2012/096026 A1 | 7/2012 |

OTHER PUBLICATIONS

Official Communication issued in corresponding European Patent Application No. 13862835.9, mailed on Dec. 17, 2015.
Official Communication issued in corresponding Chinese Patent Application No. 201380058823.3, mailed on Jun. 14, 2016.

\* cited by examiner (a)

(b)

(c)

ENGINE STARTING DEVICE

TECHNICAL FIELD

The present invention relates to an engine starting device.

BACKGROUND ART

An engine starting device described in Patent Document 1 has been known as an engine starting device to be used for a vehicle. In this conventional example, the engine starting device is formed by coupling an ignition switch to a housing accommodating a camshaft (rotational operation shaft).

The ignition switch is coupled by being fitted and held in a switch attachment part formed in the rear end of the housing, and elastic pieces are snap-locked on engagement portions of the housing to prevent the ignition switch from falling.

Moreover, the ignition switch is provided with press-fit ribs configured to come into pressure contact with the peripheries of opening portions bored in the sidewall of the switch attachment part. In this way, rattling after the fitting is reduced.

PRIOR ART DOCUMENT

Patent Document

Patent Document 1: Japanese Patent No. 4180394

SUMMARY OF THE INVENTION

Problem to be Solved by the Invention

Here, in the conventional example mentioned above, the press-fit ribs are disposed on a single circle around the periphery of the ignition switch. For this reason, it is impossible to completely prevent displacement in the fitting direction about the pressure contact portions. This results in a disadvantage that the rattling preventing effect is imperfect.

The present invention has been made in view of solving the above disadvantage, and an object thereof is to provide an engine starting device and an ignition switch usable therefor which can prevent rattling of the ignition switch in a coupled state.

Means for Solving the Problem

According to the present invention, the above object is achieved by providing an engine starting device, including: a housing 2 accommodating a rotational operation shaft 1; and an ignition switch 3 coupled to the housing 2 and configured to be actuated upon application of rotational operation force to the rotational operation shaft 1, wherein
  the ignition switch 3 is fitted and held in an attachment recess 4 formed in the housing 2, in such a way as to be prevented from falling from the attachment recess 4 by appropriate snap-locking portion 5, and
    peripheral wall surfaces of the ignition switch 3 and the attachment recess 4 on a fitting start end side and peripheral wall surfaces thereof on a fitting finish end side come into pressure contact with each other substantially simultaneously with each other when a depth of the fitting of the ignition switch 3 to the attachment recess 4 reaches a predetermined depth, to thereby reduce rattling in a radial direction.

The engine starting device is formed by coupling, to the housing 2, the ignition switch 3 configured to operate in response to operation of turning the rotational operation shaft 1 accommodated in the housing 2. For improved assemblability, the coupling of the ignition switch 3 to the housing 2 is done by fitting the ignition switch 3 into the attachment recess 4 formed in the housing 2, and the ignition switch 3 is prevented from falling by the snap-locking portion 5 formed on one of the ignition switch 3 and the housing 2 and snap-locked on the other of the ignition switch 3 and the housing 2 as a result of the fitting operation.

A fitting clearance which is essential for the coupling through the fitting will be a cause of rattling after the fitting, and may possibly result in noise during travel of the vehicle or the like, absorption of the rotational stroke of the ignition switch 3 which leads to an insufficient stroke, and so on. However, the rattling can be completely prevented by bringing the fitting wall surfaces of the ignition switch 3 and the housing 2 into pressure contact with each other.

Moreover, by setting the pressure contact spots on both the front end side and the rear end side with respect to the direction of the fitting operation, i.e. the fitting start end side and the fitting finish end side, both ends are supported, thereby forming no support about which rattling occurs. Thus, effective rattling prevention can be achieved.

The timing of the transition to the pressure contact state on each of the fitting start end side and the fitting finish end side is set to the end of the fitting operation to thereby avoid the ignition switch 3 and the housing 2 being kept in the pressure contact state continuously during the fitting operation. In this way, the fitting operation force is not excessively large, and the operability is therefore improved.

The fitting start end and the fitting start finish end may be fitted at substantially the same timing during the fitting operation, i.e. at the end of the fitting operation by, for example, providing ribs 7 near the bottom of the attachment recess 4 and the edge of the ignition switch 3 on the fitting finish end side. However, the structure will be simple by making the engine starting device such that: the pressure contact portions 6 are formed by bringing ribs 7 protruding from an outer wall of the ignition switch 3 into pressure contact with an inner wall of the attachment recess 4, the ribs 7 being provided at such positions that the ribs 7 are not continuous with each other in a circumferential direction of the outer wall of the ignition switch 3 and the ribs 7 on the fitting start end side and the ribs 7 on the fitting finish end side do not coincide with each other when seen in a direction of the fitting of the ignition switch 3; and the inner wall of the attachment recess 4 is provided with escape grooves 8 which the ribs 7 on the fitting start end side are allowed to pass through with no pressure contact to a position at which the ribs 7 on the fitting finish end side start the pressure contact.

Moreover, for these engine starting devices, an ignition switch 3 is usable which is configured to be coupled to a housing 2 accommodating a rotational operation shaft 1 by being fitted into an attachment recess 4 formed in the housing 2, and to be actuated in the coupled state upon application of rotational operation force to the rotational operation shaft 1, comprising ribs 7 provided on an outer peripheral wall surface of the ignition switch 3 at positions on a fitting start edge at which the fitting to the attachment recess 4 starts and on a fitting finish edge at which the fitting to the attachment recess 4 finishes, the positions on the fitting start edge and the fitting finish edge not coinciding with each other when seen in a direction of the fitting to the attachment recess 4, the ribs 7 being configured to come into pressure contact with an inner wall of the attachment recess 4 when the ignition switch is fitted in the attachment recess 4.

Effect of the Invention

According to the present invention, it is possible to simplify the operation of coupling an ignition switch and also effectively prevent rattling thereof after the coupling.

MODE FOR CARRYING OUT THE INVENTION

Figure 1:
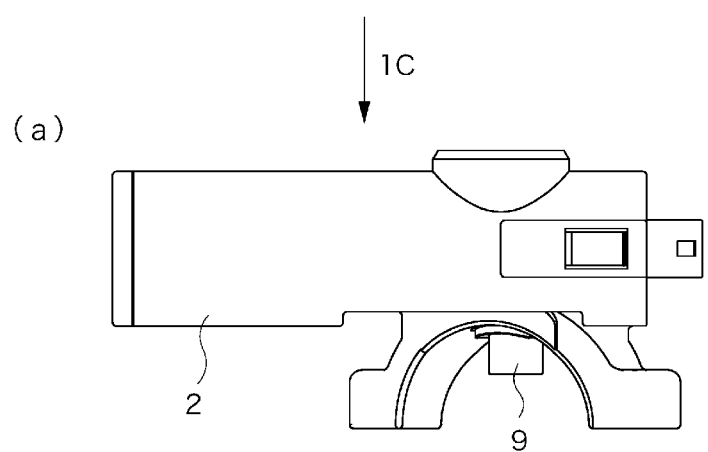
FIG. 1 is a set of views showing the present invention, and part (a) is a side view, part (b) is a front view, and part (c) is a partially cross-sectional view as seen in the direction of arrow 1C in part (a).
Figure 1:
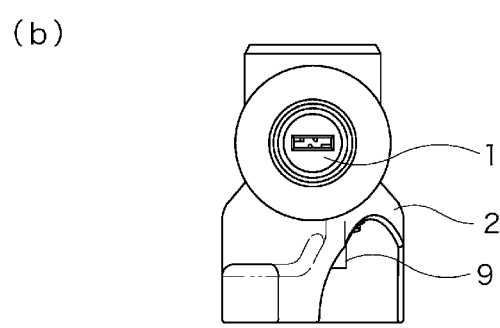
Figure 1:
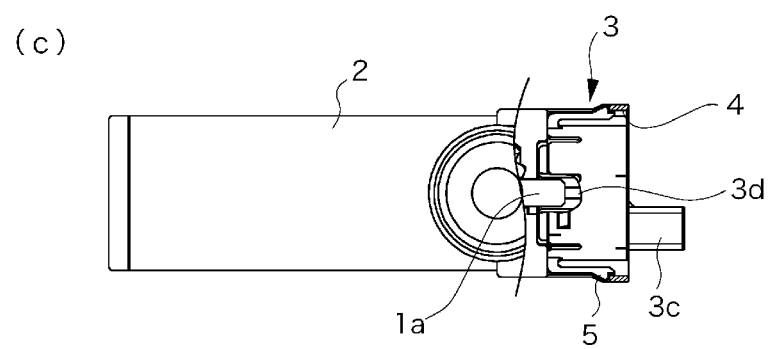

FIG. 1 shows an embodiment of the present invention made as a steering lock device. The steering lock device includes: a housing 2 in which a plug 1 is inserted, the plug 1 being turnable only by a correct unlocking key; and an ignition switch 3 coupled to the housing 2.

Moreover, in the housing 2, a locking body is attached which is configured to project from and retract into the housing 2 with turning operation of the plug 1 and to be securely engaged with a steering shaft not shown to lock the steering shaft when the plug 1 is in a locking rotational position.

Figure 2:
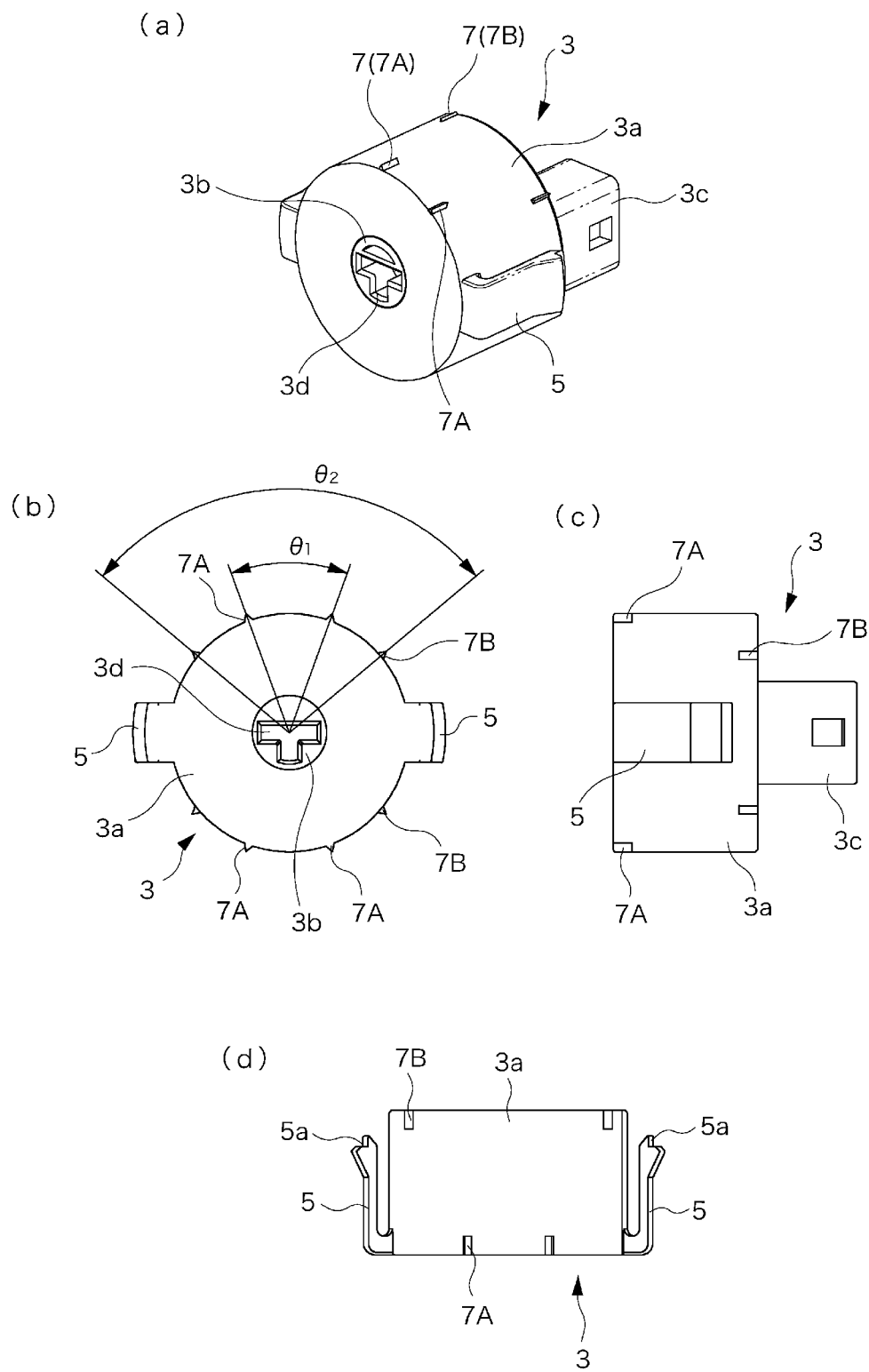
FIG. 2 is a set of views showing an ignition switch, and part (a) is a perspective view, part (b) is a front view and a side view, part (c) is a side view, and part (d) is a plan view.

As shown in FIG. 2, the ignition switch 3 is formed by an unillustrated switch plate and an unillustrated circuit board with terminals disposed thereon, which are accommodated in a cylindrical body part 3a. By turning a rotational shaft 3b fixed to a circuit board, the ignition switch 3 can change the state of connection to a contact on the circuit board. Note the reference numeral 3c in FIG. 2 denotes a connector part to be coupled to a harness.

The ignition switch 3 is coupled to the housing 2 by fitting the body part 3a into an attachment recess 4 formed in an end of the housing 2. Suppose that the ignition switch 3 is fitted as shown in part (c) of FIG. 1, and a coupling shaft portion 1a formed at an end of the plug 1 is fitted into a coupling recessed portion 3d formed in the rotational shaft 3b of the ignition switch 3 and is coupled in a rotational direction, thereby turning the plug 1 functioning as a rotational operation shaft. In this case, the rotational shaft 3b of the ignition switch 3 is turned, so that the ignition system of an engine is energized or the starter thereof is energized.

To prevent the ignition switch 3 from falling from the fitted state, the body part 3a is provided with elastically locking legs 5 as snap-locking portion each including a locking portion 5a at its free end. Each of the elastically locking legs 5 is cantilevered with the front end as an end fixed to the body part 3a and the rear end as a free end. The elastically locking legs 5 are disposed at two opposite positions.

Figure 3:
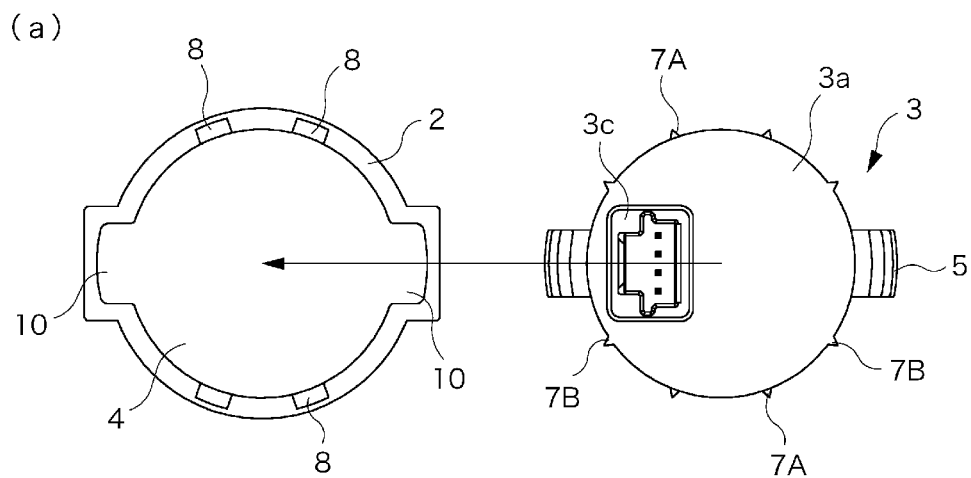
FIG. 3 is a set of views showing operation of coupling the ignition switch, and part (a) is a view as seen from the rear, part (b) is a view showing a coupled state, part (c) is a cross-sectional view taken along line 3C-3C in part (b) showing a state before fitting is completed, and part (d) is a cross-sectional view taken along line 3C-3C in part (b) showing a state after the fitting is completed.
Figure 3:
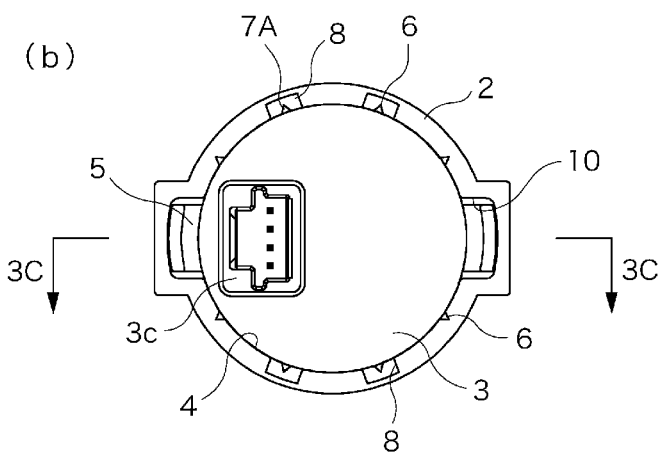
Figure 3:
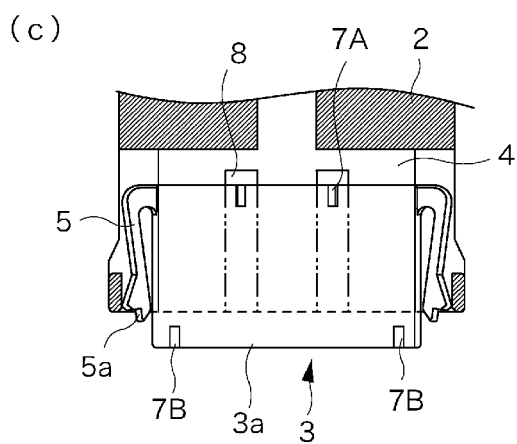
Figure 3:
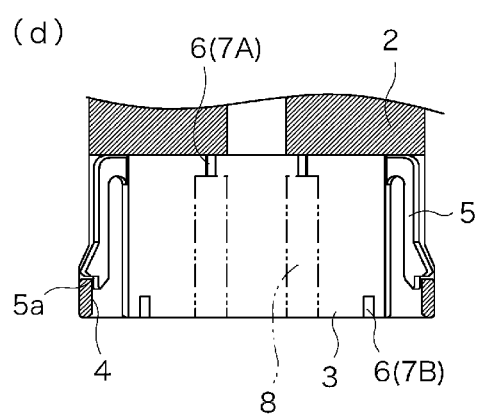

As shown in part (c) of FIG. 3, when the body part 3a of the ignition switch 3 is fitted into the attachment recess 4 with the elastically locking legs 5 coinciding with leg receiving portions 10 formed in the housing 2, the elastically locking legs 5 come into contact with the inner walls of the leg receiving portions 10, thereby getting elastically deformed, and pass through the leg receiving portions 10. Then, as shown in part (d) of FIG. 3, when the locking portions 5a reach opening portions, the elastically locking legs 5 elastically return to their original postures, so that the locking portions 5a are locked on the opening portions. Once reaching this state, the ignition switch 3 is prevented from falling from the housing 2.

To prevent rattling after the coupling due to a fitting clearance required for the fitting of the ignition switch 3 into the attachment recess 4, pressure contact portions 6 are formed at the portions of the ignition switch 3 and the attachment recess 4 of the housing 2 at which they contact each other.

The pressure contact portions 6 are formed by bringing ribs 7 protruding from the body part 3a of the ignition switch 3 into pressure contact with the inner wall of the attachment recess 4. The pressure contact portions 6 are formed at each of the front end (fitting start end) and the rear end (fitting finish end) with respect to the direction of the fitting of the ignition switch 3 into the attachment recess 4.

As shown in FIG. 2, the ribs 7 are disposed at each of a front edge which is the fitting start end of the body part 3a, and a rear edge which is the fitting finish end of the body part 3a. Ribs 7A on the fitting start end side and ribs 7B on the fitting finish end side are disposed at such positions as not to coincide with each other when seen in the direction of the fitting of the ignition switch 3. In this example, there are two sets of ribs 7A and two sets of ribs 7B provided at point-symmetrical positions, each set including two ribs 7A, 7B. Each set is disposed such that the included angle ($\theta_1$) between the ribs 7A on the fitting start end side is included in the included angle ($\theta_2$) between the ribs 7B on the fitting finish end side.

On the other hand, escape grooves 8 are bored in the inner wall surface of the attachment recess 4 at positions corresponding to the ribs 7A on the fitting start end side. The escape grooves 8 are open at the rear end of the attachment recess 4 and extend toward the front to the positions of the front ends of the ribs 7A on the fitting start end side in the state where the ribs 7B on the fitting finish end side are in pressure contact with the inner wall surface of the attachment recess 4.

Thus, in this embodiment, in the beginning of the operation of fitting the ignition switch 3 into the attachment recess 4, the ribs 7A on the fitting start end side pass through the escape grooves 8 whereas the ribs 7B on the fitting finish end side has not yet reached the attachment recess 4, thereby allowing the fitting operation without resistance. When the ribs 7B on the fitting finish end side then reach the attachment recess 4 at the end of the fitting, the ribs 7A on the fitting start end side reach the wall surfaces of the far ends of the escape grooves 8.

As the fitting operation further proceeds from this state, the ribs 7A on the fitting start end side and the ribs 7B on the fitting finish end side slide over the inner wall of the attachment recess 4 substantially simultaneously with each other, and then the fitting operation of the ignition switch 3 ends in the press-fitted state. The front and rear ends of the ignition switch 3 are now in pressure contact with the attachment recess 4, thereby preventing the rattling.

EXPLANATION OF REFERENCE NUMERALS

1 ROTATIONAL OPERATION SHAFT
2 HOUSING
3 IGNITION SWITCH
4 ATTACHMENT RECESS
5 SNAP-LOCKING PORTION
6 PRESSURE CONTACT PORTION
7A RIB ON FITTING START END SIDE
7B RIB ON FITTING FINISH END SIDE
8 ESCAPE GROOVE

The invention claimed is:

1. An engine starting device comprising:
a housing including an attachment recess and accommodating a rotational operation shaft therein; and
an ignition switch including a cylindrical body coupled to the housing and configured to be actuated upon application of rotational operation force to the rotational operation shaft, wherein
the ignition switch is fitted and held in the attachment recess in the housing by a snap-locking portion,
peripheral wall surfaces of the cylindrical body of the ignition switch include ribs protruding from a fitting start end side and from a fitting finish end side,
the ribs of the peripheral wall surfaces of the ignition switch on the fitting start end side come into pressure contact with peripheral wall surfaces of the attachment recess on a fitting start end side of the attachment recess as the ribs of the peripheral wall surfaces of the ignition switch on the fitting finish end side come into pressure contact with peripheral wall surfaces of the attachment recess on a fitting finish end side of the attachment recess, and
the pressure contact at the fitting start end side and the pressure contact at the fitting finish end side occur substantially simultaneously when a depth of the ignition switch in the attachment recess reaches a predetermined depth.

2. The engine starting device according to claim 1, wherein
pressure contact portions are defined by the pressure contact between the ribs and the peripheral wall surfaces of the attachment recess, the ribs protrude from an outer wall of the ignition switch into pressure contact with an inner wall of the attachment recess, the ribs are provided at such positions such that the ribs are not continuous with each other in a circumferential direction of the outer wall of the ignition switch, and the ribs on the fitting start end side and the ribs on the fitting finish end side do not coincide with each other when seen in a direction of the fitting of the ignition switch, and
the inner wall of the attachment recess is provided with escape grooves which the ribs on the fitting start end side are allowed to pass through with no pressure contact to a position at which the ribs on the fitting finish end side start the pressure contact.

3. An ignition switch configured to be coupled to a housing accommodating a rotational operation shaft by being fitted into an attachment recess formed in the housing, and to be actuated in the coupled state upon application of rotational operation force to the rotational operation shaft, comprising:
a cylindrical body; and
ribs provided on an outer peripheral wall surface of the cylindrical body of the ignition switch at positions on a fitting start edge at which fitting to the attachment recess starts and on a fitting finish edge at which the fitting to the attachment recess finishes, wherein
the positions of the ribs on the fitting start edge and the fitting finish edge do not coincide with each other when seen in a direction of the fitting to the attachment recess, and
the ribs on the fitting start edge and the fitting finish edge are configured to come into pressure contact with an inner wall of the attachment recess substantially simultaneously when the ignition switch is fitted in the attachment recess.

\* \* \* \* \*